Oct. 6, 1953  F. J. ARCHER ET AL  2,654,390
SWINGING SPOUT STRUCTURE
Filed Jan. 22, 1951

INVENTORS,
Farley J. Archer,
BY Timothy E. Archer.

Hamilton & Hamilton,
Attorneys.

Patented Oct. 6, 1953

2,654,390

UNITED STATES PATENT OFFICE 2,654,390

SWINGING SPOUT STRUCTURE

Farley J. Archer and Timothy E. Archer, Linden, Mo.

Application January 22, 1951, Serial No. 207,212

4 Claims. (Cl. 137—606)

This invention relates to improvements in swingable spout faucets and has particular reference to the connection between the fluid outlet on the body of the faucet and the spout swingably attached thereto.

In faucets in which the fluid is discharged through a swingable spout it has always been difficult to provide a connection between the faucet outlet and the swingable spout which does not wear out rapidly or become loosened quickly as the spout is moved from side to side. The principal object of our invention is to provide a connection between the fluid outlet in the body of the faucet and the swingable spout, which is leakproof and not subject to wear or loosening as the swingable spout is moved from side to side.

Another object of our invention is to provide a flexible tubular liner secured at its inner end to the fluid outlet in the body of the faucet and extending through a swingable spout to a point adjacent the outer end thereof, whereby fluid discharged from the body of the faucet will pass through the flexible tubular liner.

Still another object of our invention is to provide a flexible tubular liner fixed at its inner end to the fluid outlet of the body of the faucet and loosely positioned in a spout swingably attached to the body of said faucet at a point above the fluid outlet, so that when the spout is moved through an arc of substantially 180° the liner will twist within the spout but will remain fixed at its inner end to provide a leakproof fitting that is not subject to the wear or loosening by any moving parts.

Other objects of our invention are simplicity and economy of manufacture and ease of installation.

With these objects in view as well as others which will appear in the course of the specification reference will be had to the drawing wherein.

Figure 1:
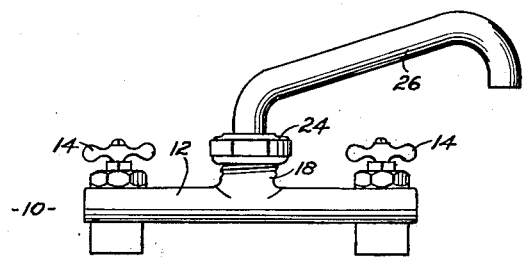
Fig. 1 is a front elevation of a swing spout mixing faucet.
Figure 2:
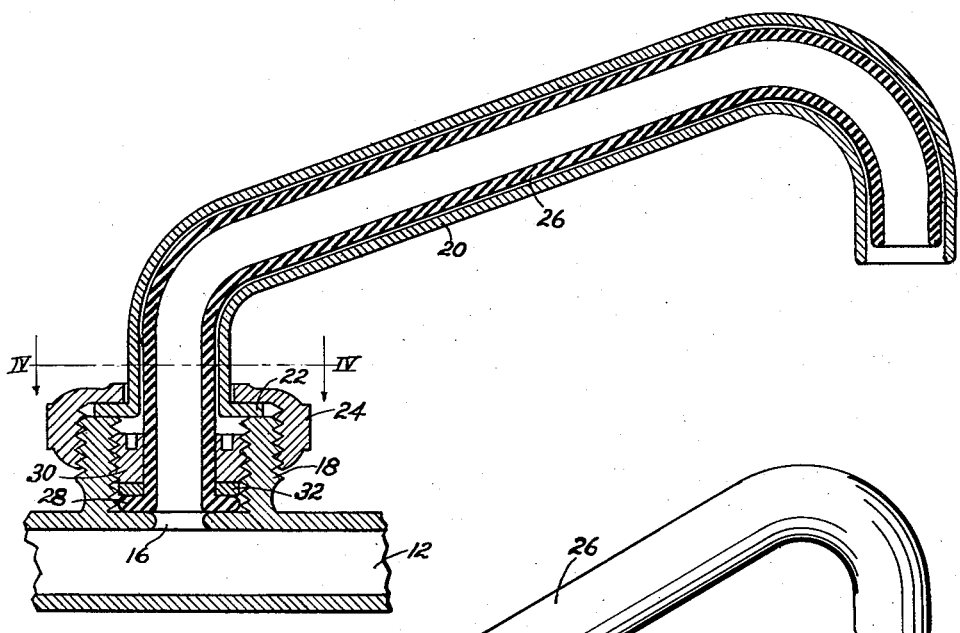
Fig. 2 is an enlarged fragmentary longitudinal sectional view of a swing spout mixing faucet embodying our invention.
Figures 3, 4:
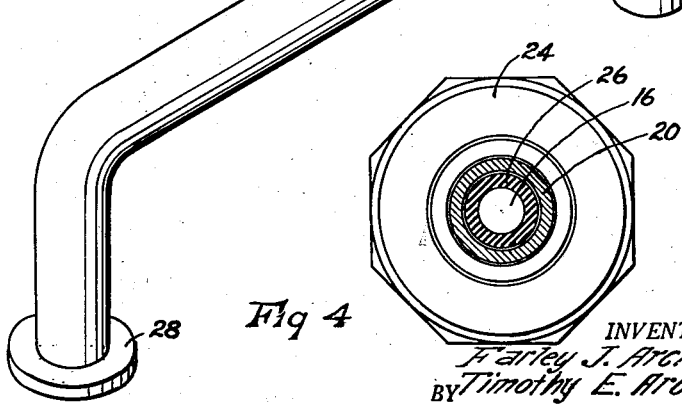
Fig. 3 is an enlarged perspective view of a flexible swing spout liner.
Fig. 4 is a fragmentary sectional view taken on line IV—IV of Fig. 2.

Like numerals refer to similar parts throughout the several views and numeral 10 indicates a swing spout mixing faucet adapted to be attached to inlet pipes of a fluid supply.

The swing spout mixing faucet 10 comprises a mixing chamber 12, inlet valves 14 attached to said mixing chamber adjacent its ends for controlling the flow of fluid into the mixing chamber, and a discharge outlet. Said discharge outlet comprises an orifice 16 formed in said mixing chamber at a point intermediate its ends, an internally and externally threaded nipple 18 attached to said mixing chamber concentrically with said orifice and extending outwardly from said mixing chamber, said nipple having a substantially larger diameter than orifice 16, and a swingable spout 20 having a flange 22 formed on its inner end and rotatably carried on the outer edge of said nipple.

Swingable spout 20 is held in operable position by appropriate means such as nut 24, said nut being formed to extend inwardly over flange 22 and being adapted to engage the external threads on nipple 18. The ease with which swingable spout 20 can be rotated is adjusted by means of adjusting the tightness of nut 24 against flange 22.

A flexible tubular liner 26 is loosely positioned in swingable spout 20 and extends outwardly to a point adjacent the mouth of said swingable spout. The inner end of said flexible tubular liner extends below the inner end of swingable spout 20 and is formed to present an annular flange 28 at its inner end. The inner end of swing spout liner 26 is positioned in nipple 18. Means for securely holding inner end of said liner against the outer surface of mixing chamber 12 adjacent the periphery of orifice 16 is provided. Said means may consist of nut 30 and washer 32, said nut being adapted to engage the internal threads of nipple 18. Thus when fluid is discharged from mixing chamber 12 it will pass through flexible liner 26 to the point of discharge.

Said flexible liner is of smaller diameter than the inner walls of said swingable spout whereby the liner will easily twist within the spout 24 as said swingable spout is rotated through an arc of substantially 180 degrees, while remaining fixed at its inner end against mixing chamber 12. The connection thus provided at the inner end of said flexible liner is not subject to wear or loosening by any moving parts.

When the flexible liner 26 is positioned in the swingable spout 20 it is preferable that the swingable spout be in a medial position so that the maximum twist occuring in said flexible liner will be at the point when the swingable spout has been rotated through an arc of substantially 90 degrees.

While this particular swinging spout structure is shown and described as used on a mixing faucet it is quite apparent that it is adapted for use on any liquid flow line having an adjustable spout for selectively delivering the liquid to various points.

Having fully described our invention, what we claim is:

1. A swing spout mixing valve comprising a mixing chamber having valved inlets and an outlet including a nipple attached to said mixing chamber and extending outwardly therefrom and a swingable spout rotatably carried by said nipple, a flexible tubular liner positioned in said swingable spout and secured at its inner end portion to said mixing chamber and extending through said nipple to a point adjacent the mouth of said swingable spout, whereby water discharged from said mixing chamber will pass through said flexible swing spout liner.

2. A swing spout mixing valve comprising a mixing chamber having valved inlets, an outlet including a nipple attached to said mixing chamber and extending outwardly therefrom and a swingable spout rotatably carried by said nipple, a flexible tubular liner positioned in said swingable spout and formed to present a flange at its inner end, means for tightly securing said flange to said mixing chamber to provide a leakproof connection therebetween, and said flexible tubular liner extending through said nipple to a point adjacent the outer end of said swingable spout, whereby fluid discharged from said mixing chamber will pass through said flexible tubular liner.

3. A swing spout mixing valve comprising a mixing chamber having inlets and an outlet including an externally and internally threaded nipple attached to said mixing chamber and extending outwardly therefrom and a swingable spout rotatably carried on the outer edge of said nipple, a flexible tubular liner positioned in said swingable spout and formed to present a flange at its inner end, an externally threaded nut adapted to inner threads of said nipple by which said flange is tightly secured to said mixing chamber to provide a leakproof and stationary connection therebetween, and said flexible tubular liner extending through said nut and nipple to a point adjacent the outer end of said swingable spout, whereby water discharged from said mixing chamber will pass through said flexible swing spout liner.

4. A swing spout mixing valve comprising a mixing chamber having valved inlets and an outlet including an externally and internally threaded nipple attached to said mixing chamber and extending outwardly therefrom and a swingable spout rotatably carried by said nipple, a nut formed to extend over a flange formed on the inner end of said swingable spout and having depending walls adapted to engage the external threads on said nipple, a flexible tubular liner positioned in said swingable spout and formed to present a flange at its inner end, a nut adapted to the inner threads of said nipple by which said flange is tightly secured to said mixing chamber to provide a leakproof connection therebetween, and said flexible tubular liner extending through said nut and nipple to a point adjacent the outer end of said swingable spout, whereby fluid discharged from said mixing chamber will pass through said flexible tubular liner.

FARLEY J. ARCHER.
TIMOTHY E. ARCHER.

References Cited in the file of this patent

UNITED STATES PATENTS

| Number | Name | Date |
|---|---|---|
| 1,583,944 | Eweyk | May 11, 1926 |
| 2,094,161 | Paddock | Sept. 28, 1937 |
| 2,257,895 | Woodford et al. | Oct. 7, 1941 |
| 2,570,635 | Beyer | Oct. 9, 1951 |

FOREIGN PATENTS

| Number | Country | Date |
|---|---|---|
| 776,066 | France | 1941 |